L. R. McCUTCHEN.
ELECTRIC STARTING MECHANISM.
APPLICATION FILED AUG. 4, 1916.

1,242,959.

Patented Oct. 16, 1917.

Witness
R. W. Stevens.

Inventor
L. R. McCutchen.

By John Louis Waters

Attorney

UNITED STATES PATENT OFFICE.

LEE R. McCUTCHEN, OF MEMPHIS, TENNESSEE.

ELECTRIC STARTING MECHANISM.

1,242,959.  Specification of Letters Patent.  Patented Oct. 16, 1917.

Application filed August 4, 1916. Serial No. 113,161.

*To all whom it may concern:*

Be it known that I, LEE R. McCUTCHEN, a citizen of the United States, residing at Memphis, in the county of Shelby and State of Tennessee, have invented certain useful Improvements in Electric Starting Mechanisms, of which the following is a specification, reference being had therein to the accompanying drawing.

This invention relates to improvements in electric starting mechanisms for explosion engines and of that type used in conjunction with motor vehicles, one object of the invention being the provision of a generator operated from one of the wheels of the vehicle and a motor operably connected to the fly wheel of an explosion engine, whereby the direct torque of the generator upon the explosion engine is relieved.

Among the other aims and objects of the present invention may be recited the provision of a device of the character mentioned with a view to compactness, and in which the number of parts are few, the construction simple, the cost of production low and the efficiency high.

Other objects as well as the nature, characteristic features and scope of this invention will be more readily apparent from the following description taken in connection with the accompanying drawings, and pointed out in the claims, forming a part of this specification.

In the accompanying drawings:—

Figure 1:
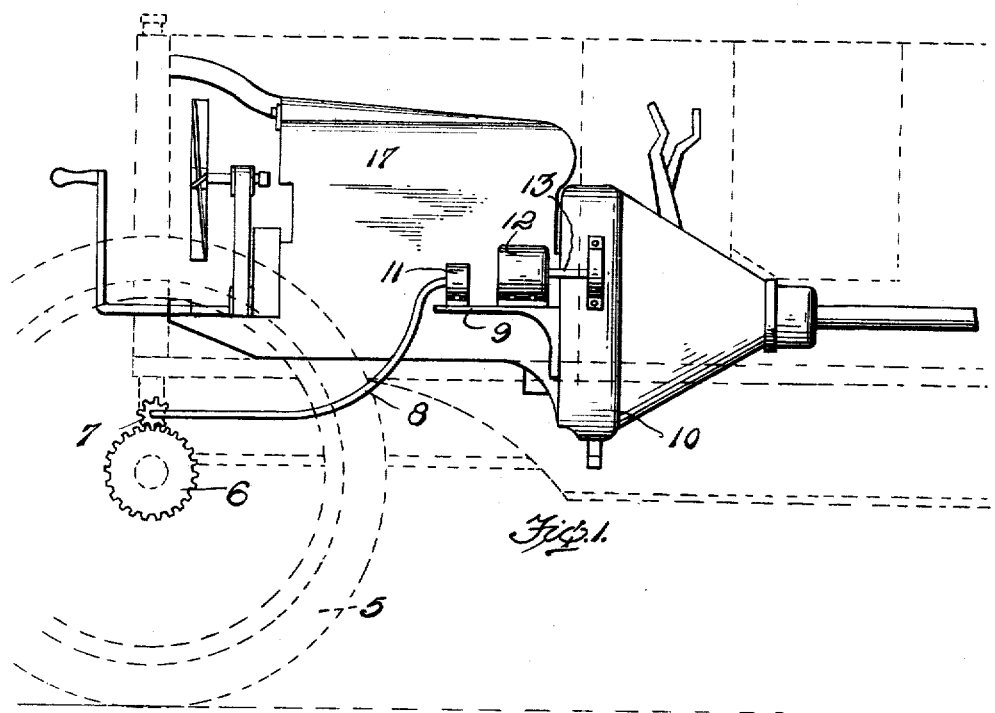
Figure 1 is a side elevation of the forward end of a motor car showing the present invention in operable relation thereto.
Figures 2, 3:
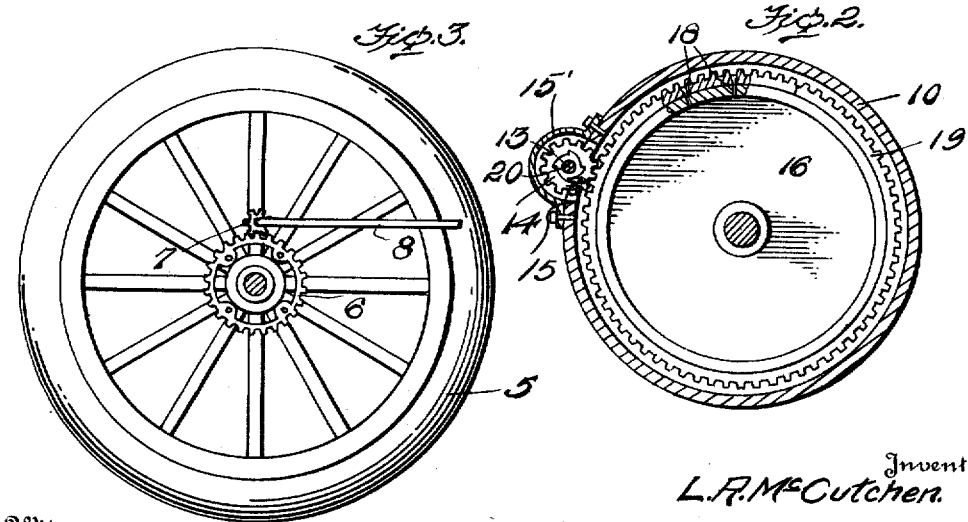
Fig. 2 is a view in elevation of the wheel connection to the flexible shaft of the generator.
Fig. 3 is a plan view of the detachable gear carried by the fly wheel of the engine and the motor carried gear.

Referring to the drawings, the numeral 5 designates one of the front wheels of the motor car which is indicative of any one of the wheels to which is adapted to be connected the toothed sprocket or gear wheel 6 which meshes at all times with the toothed wheel 7 carried by the flexible shaft 8.

A bracket 9 is attached to the transmission casing 10 and has mounted thereon the electric generator 11 which is operably connected to the shaft 8. Thus, as the shaft 8 is rotated, the generator is also rotated and supplies current to the storage battery, not shown.

Also mounted upon the bracket 9 is an electric motor 12, whose shaft 13 carries the small gear 14 which projects through the opening 15 of the transmission casing 10, and itself is incased by the protecting casing 15.

The fly wheel 16 of the engine 17 has detachably connected thereto by means of studs 18, the gear strip 19 which is in mesh at all times with the small gear 14.

The gear 14 is preferably connected to the shaft 13 through a pawl and ratchet connection 20, by means of which after the engine is speeded the motor may not be affected, but the gear 14 be permitted to rotate freely without affecting the shaft 13.

What I claim as new is:—

The combination with the fly wheel of an explosive engine, of a casing for the fly wheel and having a slot in the wall thereof opposite of the periphery of the fly wheel, a bracket extending from the casing, a motor on the bracket, a shaft operably connected to the motor, a gear loose upon the free end of the shaft and arranged in the slot in the casing, a pawl and ratchet clutch mechanism for operably connecting the gear to the shaft so that the gear will be rotated in one direction by the shaft, an auxiliary casing carried by the main casing for inclosing the gear and the clutch mechanism, and a gear strip connected to the periphery of the fly wheel and engageable by the gear.

In testimony whereof I affix my signature.

LEE R. McCUTCHEN.

Copies of this patent may be obtained for five cents each, by addressing the "Commissioner of Patents, Washington, D. C."